(12) United States Patent
Kadota

(10) Patent No.: US 10,652,415 B2
(45) Date of Patent: May 12, 2020

(54) CONTROL METHOD

(71) Applicant: CANON KABUSHIKI KAISHA, Tokyo (JP)

(72) Inventor: Eiji Kadota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/681,081

(22) Filed: Aug. 18, 2017

(65) Prior Publication Data

US 2018/0054536 A1  Feb. 22, 2018

(30) Foreign Application Priority Data

Aug. 22, 2016 (JP) ................................ 2016-162208

(51) Int. Cl.
*H04N 1/00* (2006.01)
*H04W 52/02* (2009.01)
(Continued)

(52) U.S. Cl.
CPC ....... *H04N 1/00896* (2013.01); *G06F 3/1221* (2013.01); *G06F 3/1229* (2013.01);
(Continued)

(58) Field of Classification Search
CPC ....... H04N 1/00896; H04N 2201/0094; H04N 1/00885; H04N 1/00888; H04N 1/00891; H04N 1/00904; H04N 1/00962; H04N 1/00973; H04N 2201/0074; H04N 2201/0075; G06F 3/1292; G06F 3/1293;
(Continued)

(56) References Cited

U.S. PATENT DOCUMENTS

2011/0320928 A1* 12/2011 Kuroda ................. G06F 16/972
715/234
2013/0145183 A1*  6/2013 Wada ........................ G06F 1/26
713/300
(Continued)

FOREIGN PATENT DOCUMENTS

| CN | 103297641 A | 9/2013 |
|---|---|---|
| JP | 2012-247528 A | 12/2012 |
| JP | 2013-186505 A | 9/2013 |

*Primary Examiner* — Kent Yip
(74) *Attorney, Agent, or Firm* — Canon U.S.A., Inc. IP Division

(57) ABSTRACT

To improve convenience for a user using a communication apparatus for operating in a power saving state, or to improve convenience for a user using an information processing apparatus for acquiring information from a communication apparatus for operating in a power saving state, a control method includes, in a case where acquired state information indicates that the communication apparatus is in a second state, causing the information processing apparatus to operate in a state where the information processing apparatus can transmit an execution request to execute a function using a predetermined hardware component to the communication apparatus, and in a case where the acquired state information indicates that the communication apparatus is in a first state, causing the information processing apparatus to operate in a state where the information processing apparatus does not transmit the execution request to the communication apparatus.

17 Claims, 14 Drawing Sheets

(51) Int. Cl.
*H04W 4/80* (2018.01)
*G06F 3/12* (2006.01)
*H04W 52/18* (2009.01)
*H04W 84/12* (2009.01)

(52) U.S. Cl.
CPC ......... *G06F 3/1292* (2013.01); *G06F 3/1293* (2013.01); *H04W 4/80* (2018.02); *H04W 52/028* (2013.01); *H04W 52/0209* (2013.01); *H04W 52/18* (2013.01); H04N 2201/0094 (2013.01); H04W 84/12 (2013.01); Y02D 70/00 (2018.01); Y02D 70/10 (2018.01); Y02D 70/14 (2018.01); Y02D 70/142 (2018.01); Y02D 70/144 (2018.01); Y02D 70/166 (2018.01)

(58) Field of Classification Search
CPC .... G06F 3/1229; G06F 3/1221; G06F 3/1294; G06F 3/1236; H04W 4/80; H04W 52/028; H04W 52/0209; H04W 52/18; H04W 84/12
See application file for complete search history.

(56) References Cited

U.S. PATENT DOCUMENTS

| | | |
|---|---|---|
| 2013/0229672 A1 | 9/2013 | Naruse |
| 2013/0229684 A1* | 9/2013 | Yasuzaki ............ H04N 1/00127 358/1.15 |
| 2015/0286448 A1 | 10/2015 | Nitta et al. |
| 2016/0026417 A1* | 1/2016 | Inoue .................... G06F 3/1236 358/1.15 |
| 2016/0073348 A1 | 3/2016 | Tsuzuki |
| 2017/0315763 A1* | 11/2017 | Kennedy .......... H04W 52/0229 |

* cited by examiner

FIG. 6

| Service UUID | Service Name | Characteristic UUID | Characteristic Name | Service Readable | Service Writable | Characteristic Readable | Characteristic Writable | Value |
|---|---|---|---|---|---|---|---|---|
| 0x180A | Device Information | 0x2A29 | Manufacturer Name String | | | ○ | | Printer Device |
| | | 0x2A24 | Hardware Revision String | ○ | | ○ | | 1010_AAA |
| | | 0x2A25 | Firmware Revision String | | | ○ | | 2030000 |
| | | 0x2A26 | Software Revision String | | | ○ | | 0001 |
| 00000000-0000-1000-8000-00405f9b34fb | User Default Information | 00000000-0000-2000-1000-00405f9b34fb | SSID | ○ | ○ | ○ | | Printer SSID |
| | | 00000000-0000-2000-1000-00405f9b34fc | Password | | | ○ | | aaaa bbbb |
| | | 00000000-0000-2000-1000-00405f9b34fd | Software-On Command | | | | ○ | Power On |

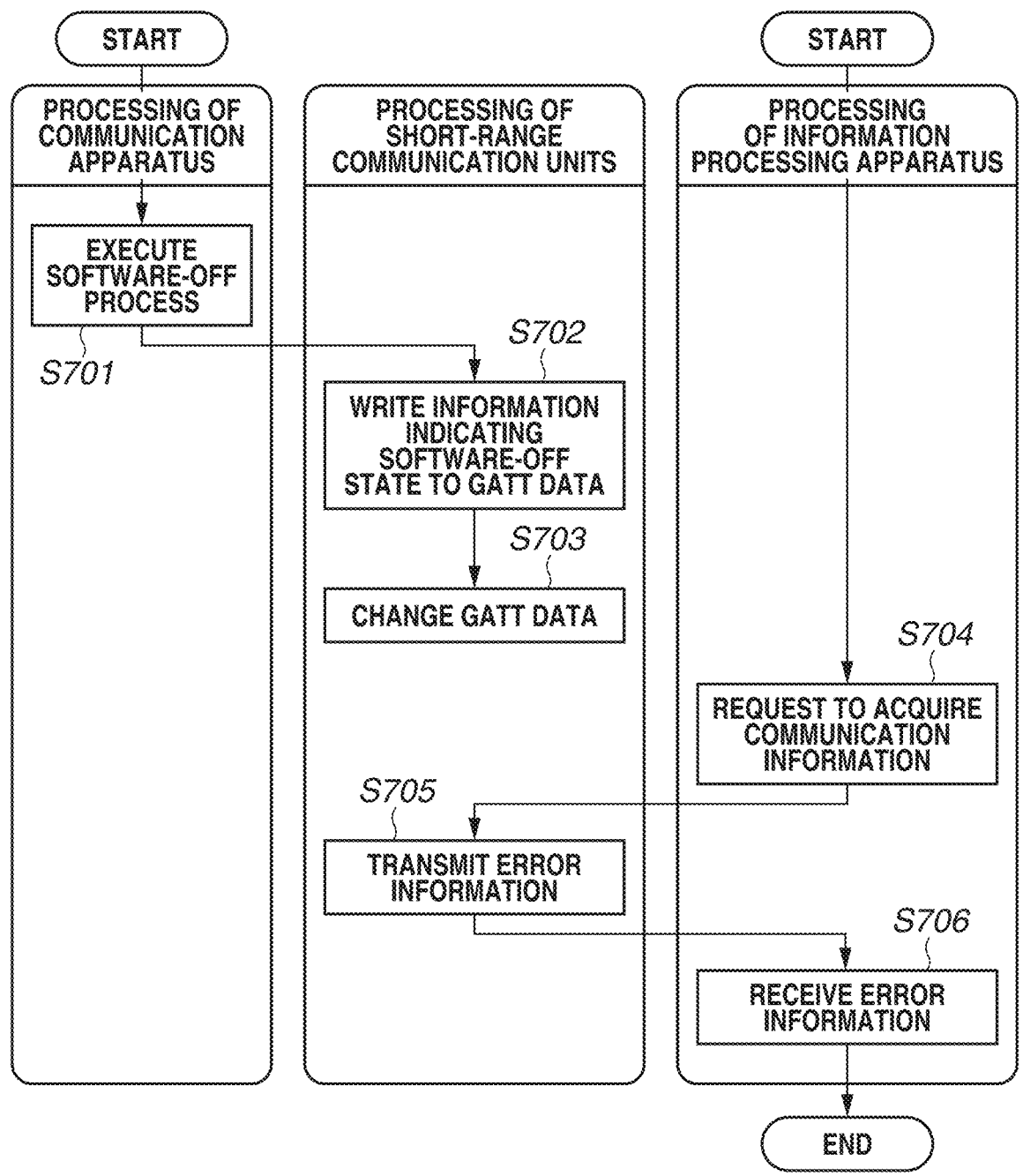

FIG. 8

| Service UUID | Service Name | Characteristic UUID | Characteristic Name | Service Readable | Service Writable | Characteristic Readable | Characteristic Writable | Value |
|---|---|---|---|---|---|---|---|---|
| 0x180A | Device Information | 0x2A29 | Manufacturer Name String | | | ○ | | Printer Device |
| | | 0x2A24 | Hardware Revision String | ○ | | ○ | | 1010_AAA |
| | | 0x2A25 | Firmware Revision String | | | ○ | | 2030000 |
| | | 0x2A26 | Software Revision String | | | ○ | | 0001 |
| 00000000-0000-1000-00-00405f9b34fb | User Default Information | 00000000-0000-2000-1000-0040-5f9b34fb | SSID | | | | | Printer SSID |
| | | 00000000-0000-2000-1000-0040-5f9b34fc | Password | ○ | ○ | | | aaaa bbbb |
| | | 00000000-0000-2000-1000-0040-5f9b34fd | Software-On Command | | | | ○ | Power On |

FIG.9

| Service UUID | Service Name | Characteristic UUID | Characteristic Name | Service Readable | Service Writable | Characteristic Readable | Characteristic Writable | Value |
|---|---|---|---|---|---|---|---|---|
| 0x180A | Device Information | 0x2A29 | Manufacturer Name String | | | ○ | | Printer Device |
| | | 0x2A24 | Hardware Revision String | ○ | | ○ | | 1010_AAA |
| | | 0x2A25 | Firmware Revision String | | | ○ | | 2030000 |
| | | 0x2A26 | Software Revision String | | | ○ | | 0001 |
| 00000000-0000-1000-8000-00805f9b34fb | User Default Information | 00000000-0000-2000-1000-00405l9b34fd | Software-On Command | ○ | ○ | | ○ | Power On |

CONTROL METHOD

BACKGROUND OF THE INVENTION

Field of the Invention

The present invention relates to a control method.

Description of the Related Art

There is known a communication apparatus capable of operating in a normal state or a power saving state (first state) where power consumption is smaller than in the normal state (second state). Further, there is also known an information processing apparatus for acquiring, from such a communication apparatus, predetermined information (e.g., communication information for communicating with the communication apparatus). The publication of Japanese Patent Application Laid-Open No. 2012-247528 discusses an apparatus including a normal mode and a power saving mode where a supply current value is smaller than in the normal mode, the apparatus including a normal operation unit for operating in the normal mode and stopping in the power saving mode, and a continuous operation unit for operating both in the normal mode and the power saving mode. Further, the publication of Japanese Patent Application Laid-Open No. 2013-186505 discusses an apparatus for reading different information according to the power state of a multifunction peripheral (MFP), using short-range wireless communication, and for switching control based on the read information.

Incidentally, a communication apparatus operating in a power saving state as discussed in the publication of Japanese Patent Application Laid-Open No. 2012-247528 may execute power saving control for stopping the supply of power to some of hardware components.

Thus, the following problem arises. For example, the communication apparatus operating in the power saving state cannot acquire information regarding the hardware components subjected to the power saving control, and may provide information regarding these components that is not the latest information for an information processing apparatus as discussed in the publication of Japanese Patent Application Laid-Open No. 2013-186505. Then, if the information that is not the latest information is used by the information processing apparatus, a malfunction may reduce convenience for a user of the information processing apparatus.

Further, the following problem arises. For example, the communication apparatus operating in the power saving state may not be able to execute a predetermined function using the hardware components subjected to the power saving control. Thus, even if the communication apparatus is instructed by the information processing apparatus to execute the function based on information provided by the communication apparatus for the information processing apparatus, the communication apparatus operating in the power saving state may not be able to respond to this instruction. This may reduce convenience for a user of the information processing apparatus.

To solve at least one of the above problems, the present invention is directed to improving convenience for a user using a communication apparatus for operating in a power saving state, or directed to improving convenience for a user using an information processing apparatus for acquiring information from a communication apparatus for operating in a power saving state.

SUMMARY OF THE INVENTION

According to an aspect of the present invention, a control method for controlling an information processing apparatus for communicating with a communication apparatus, wherein power supplied to a predetermined hardware component included in the communication apparatus in a case where the communication apparatus is in a first state is smaller than power supplied to the predetermined hardware component in a case where the communication apparatus is in a second state, or power is not supplied to the predetermined hardware component in a case where the communication apparatus is in the first state, includes acquiring state information regarding a state of the communication apparatus, in a case where the acquired state information indicates that the communication apparatus is in the second state, causing the information processing apparatus to operate in a state where the information processing apparatus can transmit an execution request to execute a function using the predetermined hardware component to the communication apparatus, and in a case where the acquired state information indicates that the communication apparatus is in the first state, causing the information processing apparatus to operate in a state where the information processing apparatus does not transmit the execution request to the communication apparatus, and transmitting the execution request to the communication apparatus in a state where the information processing apparatus can transmit the execution request to the communication apparatus.

According to another aspect of the present invention, a control method for controlling a communication apparatus, wherein power supplied to a predetermined hardware component included in the communication apparatus in a case where the communication apparatus is in a first state is smaller than power supplied to the predetermined hardware component in a case where the communication apparatus is in a second state, or power is not supplied to the predetermined hardware component in a case where the communication apparatus is in the first state, includes acquiring state information regarding a state of the communication apparatus, and in a case where the acquired state information indicates that the communication apparatus is in the second state, causing the communication apparatus to operate in a state where the communication apparatus can transmit, to an information processing apparatus, predetermined information for causing the information processing apparatus to operate in a state where the information processing apparatus can transmit an execution request to execute a function using the predetermined hardware component to the communication apparatus, and in a case where the acquired state information indicates that the communication apparatus is in the first state, causing the communication apparatus to operate in a state where the communication apparatus does not transmit the predetermined information to the information processing apparatus.

According to yet another aspect of the present invention, a control method for controlling an information processing apparatus for communicating with a communication apparatus, wherein power supplied to a predetermined hardware component included in the communication apparatus in a case where the communication apparatus is in a first state is smaller than power supplied to the predetermined hardware component in a case where the communication apparatus is in a second state, or power is not supplied to the predetermined hardware component in a case where the communication apparatus is in the first state, includes acquiring state information regarding a state of the communication apparatus, in a case where the acquired state information indicates that the communication apparatus is in the second state, causing the information processing apparatus to operate in a state where the information processing apparatus can transmit an execution request to execute a predetermined function using the predetermined hardware component to the communication apparatus, in a case where the acquired state information indicates that the communication apparatus is in the first state, notifying a user that the communication apparatus is in a state where the communication apparatus does not execute the predetermined function, and transmitting the execution request to the communication apparatus in a state where the information processing apparatus can transmit the execution request to the communication apparatus.

Further features of the present invention will become apparent from the following description of exemplary embodiments with reference to the attached drawings.

BRIEF DESCRIPTION OF THE DRAWINGS

FIG. 6 is a table illustrating an example of GATT data saved in the short-range communication unit.

FIG. 7 is a flowchart illustrating processing executed by the communication apparatus and the information processing apparatus in a case where the communication apparatus is in the software-off state.

FIG. 8 is a table illustrating an example of GATT data saved in the short-range communication unit.

FIG. 9 is a table illustrating an example of GATT data saved in the short-range communication unit.

DESCRIPTION OF THE EMBODIMENTS

With reference to the drawings, exemplary embodiments of the present invention will be illustratively described below. Regarding the present invention, however, it should be understood that appropriate changes and improvements in the following exemplary embodiments based on the normal knowledge of a person skilled in the art without departing the spirit of the present invention are also included in the scope of the present invention.

A first exemplary embodiment is described below. A description is given of an information processing apparatus and a communication apparatus included in a communication system according to the present exemplary embodiment. In the present exemplary embodiment, a smartphone is illustrated as an example of the information processing apparatus. The present exemplary embodiment, however, is not limited to this. Alternatively, the information processing apparatus is applicable to various apparatuses such as a mobile terminal, a laptop personal computer (PC), a tablet terminal, a personal digital assistant (PDA), and a digital camera. Further, in the present exemplary embodiment, a printer is illustrated as an example of the communication apparatus. The present exemplary embodiment, however, is not limited to this. Alternatively, the communication apparatus is applicable to various apparatuses so long as the apparatuses can wirelessly communicate with the information processing apparatus. For example, in the case of a printer, the communication apparatus can be applied to an inkjet printer, a full-color laser beam printer, and a monochrome printer. Further, the communication apparatus is applicable not only to a printer, but also to a copying machine, a facsimile apparatus, a mobile terminal, a smartphone, a laptop PC, a tablet terminal, a PDA, a digital camera, a music reproduction device, and a television. Additionally, the communication apparatus is also applicable to a multifunction peripheral having a plurality of functions such as a copy function, a fax function, and a print function.

Figure 1:
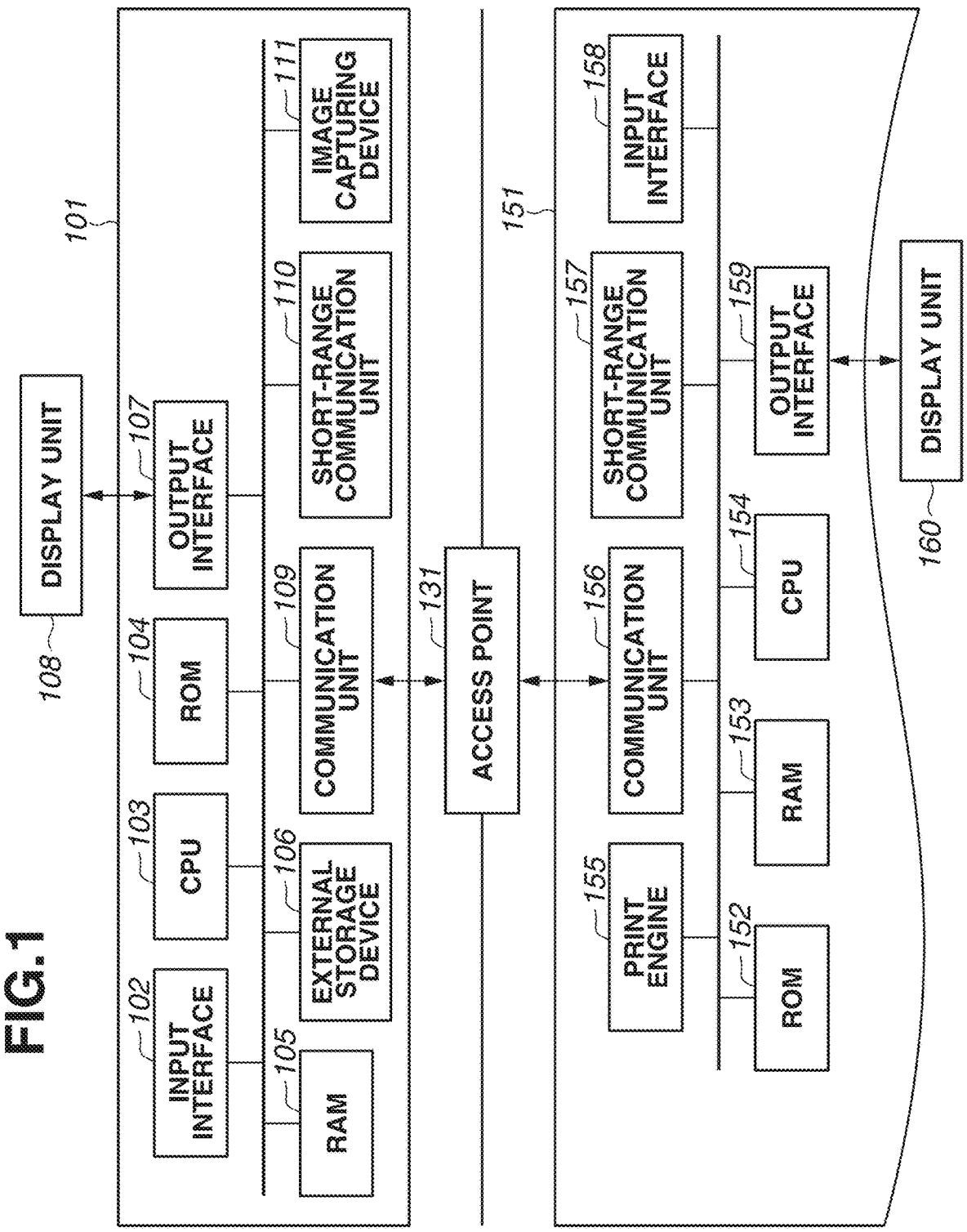
FIG. 1 is a diagram illustrating configurations of an information processing apparatus and a communication apparatus according to an exemplary embodiment.

First, with reference to a block diagram in FIG. 1, a description is given of hardware components of the information processing apparatus and the communication apparatus according to the present exemplary embodiment. Further, although the present exemplary embodiment is described taking the following configurations as examples, the present exemplary embodiment is applicable to apparatuses capable of communicating with each other, and functions and configurations are not particularly limited as illustrated in FIG. 1.

An information processing apparatus 101 is the information processing apparatus according to the present exemplary embodiment. The information processing apparatus 101 includes hardware components such as an input interface 102, a central processing unit (CPU) 103, a read-only memory (ROM) 104, a random-access memory (RAM) 105, an external storage device 106, an output interface 107, a display unit 108, a communication unit 109, a short-range communication unit 110, and an image capturing device 111.

The input interface 102 is an interface for receiving the input of data or an operation instruction from a user through a physical keyboard, a button, and a touch panel.

The CPU 103 is a system control unit and controls the entirety of the information processing apparatus 101.

The ROM 104 stores fixed data such as control programs to be executed by the CPU 103, a data table, and an embedded operating system (hereinafter referred to as "OS") program. In the present exemplary embodiment, the control programs stored in the ROM 104 control the execution of software such as scheduling, a task switch, and an interrupt process under control of the embedded OS stored in the ROM 104.

The RAM 105 includes a static random-access memory (SRAM), which requires a backup power supply. In the RAM 105, data is held by a primary battery for data backup (not illustrated). Thus, the RAM 105 can store important data such as a program control variable without volatilizing the data. Further, a memory area for storing setting information of the information processing apparatus 101 and management data of the information processing apparatus 101 is also provided in the RAM 105. Further, the RAM 105 is used also as a main memory and a work memory for the CPU 103.

The external storage device 106 includes an application for providing a print execution function (hereinafter referred to as a "print application"). Further, the external storage device 106 includes various programs such as a print information generation program for generating print information that can be interpreted by a communication apparatus 151, and an information transmission/reception control program for transmitting and receiving information to and from the communication apparatus 151 connected to the information processing apparatus 101 via the communication unit 109. The external storage device 106 saves various pieces of information to be used in these programs. Further, the external storage device 106 also saves image data obtained from another information processing apparatus or the Internet via the communication unit 109.

The output interface 107 is an interface for controlling the display unit 108 to display data or give a notification of the state of the information processing apparatus 101.

The display unit 108 includes a light-emitting diode (LED) or a liquid crystal display (LCD). The display unit 108 displays data or gives a notification of the state of the information processing apparatus 101. The display unit 108 may include a touch panel. In this case, the information processing apparatus 101 may cause the display unit 108 to display a software keyboard including keys such as a numerical value input key, a mode setting key, a determination key, a cancellation key, and a power key, thereby receiving an input from the user through the display unit 108.

The communication unit 109 is a component for connecting to an apparatus such as the communication apparatus 151 and communicating data. For example, the communication unit 109 can connect to an access point (not illustrated) in the communication apparatus 151. The communication unit 109 and the access point in the communication apparatus 151 connect to each other, whereby the information processing apparatus 101 and the communication apparatus 151 can communicate with each other. The communication unit 109 may directly communicate with the communication apparatus 151 through wireless communication, or may communicate with the communication apparatus 151 via an external access point (an access point 131) present outside the information processing apparatus 101 and the communication apparatus 151. Examples of the wireless communication method include Wireless Fidelity (Wi-Fi) (registered trademark) and Classic Bluetooth (registered trademark). Further, examples of the access point 131 include a device such as a wireless local area network (LAN) router. In the present exemplary embodiment, a method in which the information processing apparatus 101 and the communication apparatus 151 directly connect to each other without the external access point is referred to as a "direct connection method". Further, a method in which the information processing apparatus 101 and the communication apparatus 151 connect to each other via the external access point is referred to as an "infrastructure connection method". Further, the communication unit 109 may include hardware functioning as an access point, or may operate as an access point by software for causing the communication unit 109 to function as an access point. Further, in the present exemplary embodiment, the communication unit 109 can perform communication over a longer range than communication (short-range wireless communication) executed by the short-range communication unit 110.

The short-range communication unit 110 is a component for wirelessly connecting to an apparatus such as the communication apparatus 151 over a short range and communicating data. The short-range communication unit 110 communicates using a communication method different from that of the communication unit 109. The short-range communication unit 110 can connect to a short-range communication unit 157 in the communication apparatus 151. In the present exemplary embodiment, as the communication method of the short-range communication unit 110, Bluetooth Low Energy (registered trademark) (hereinafter referred to as "BLE") is used. Thus, the short-range communication unit 110 communicates with another short-range communication unit through Generic Attribute Profile (GATT) communication defined by the BLE standard. The communication method used by the short-range communication unit 110 is not limited to BLE, and may be another communication method such as near-field communication (NFC).

The image capturing device 111 is a device for converting an image captured by an image sensor into digital data. The digital data is once stored in the RAM 105. Then, the digital data is converted into a predetermined image format by a program executed by the CPU 103, and the resulting data is saved as image data in the external storage device 106.

The communication apparatus 151 is the communication apparatus according to the present exemplary embodiment. The communication apparatus 151 includes a ROM 152, a RAM 153, a CPU 154, a print engine 155, a communication unit 156, a short-range communication unit 157, an input interface 158, an output interface 159, and a display unit 160.

The communication unit 156 includes, as an access point in the communication apparatus 151, an access point for connecting to an apparatus such as the information processing apparatus 101. The access point can connect to the communication unit 109 of the information processing apparatus 101. The communication unit 156 may directly communicate with the information processing apparatus 101 through wireless communication, or may communicate with the information processing apparatus 101 via the access point 131. Examples of the communication method include Wi-Fi (registered trademark) and Classic Bluetooth (registered trademark). Further, the communication unit 156 may include hardware functioning as an access point, or may operate as an access point by software for causing the communication unit 156 to function as an access point.

The RAM 153 includes a dynamic random-access memory (DRAM), which requires a backup power supply. In the RAM 153, data is held by supplying power for data backup (not illustrated). Thus, the RAM 153 can store important data such as a program control variable without volatilizing the data. Further, the RAM 153 is used also as a main memory and a work memory for the CPU 154. The RAM 153 saves a reception buffer for temporarily saving print information received from the information processing apparatus 101 and also saves various pieces of information.

The ROM 152 stores fixed data such as control programs to be executed by the CPU 154, a data table, and an OS program. In the present exemplary embodiment, the control programs stored in the ROM 152 control the execution of software such as scheduling, a task switch, and an interrupt process under control of the embedded OS stored in the ROM 152. Further, in the ROM 152, a memory area for storing data that needs to be held also in a case where power is not supplied, such as setting information of the communication apparatus 151 and management data of the communication apparatus 151, is also provided.

The CPU 154 is a system control unit and controls the entirety of the communication apparatus 151.

Based on information saved in the RAM 153 or print information received from the information processing apparatus 101, the print engine 155 forms an image on a recording medium such as paper using a recording agent such as ink and outputs the printing result. At this time, the print information transmitted from the information processing apparatus 101 has a large amount of transmitted data and requires high-speed communication. Thus, the print information is received via the communication unit 156, which can communicate at higher speed than the short-range communication unit 157.

The input interface 158 is an interface for receiving the input of data or an operation instruction from the user and includes a physical keyboard, a button, and a touch panel. The form may be such that the output interface 159 and the input interface 158 are the same component, and this same component outputs a screen and receives an operation from the user. The output interface 159 is an interface for controlling the display unit 160 to display data or give a notification of the state of the communication apparatus 151.

The display unit 160 includes an LED or an LCD. The display unit 160 displays data or gives a notification of the state of the communication apparatus 151. On the display unit 160, a software keyboard including keys such as a numerical value input key, a mode setting key, a determination key, a cancellation key, and a power key may be provided, thereby receiving an input from the user through the display unit 160.

Figure 2:
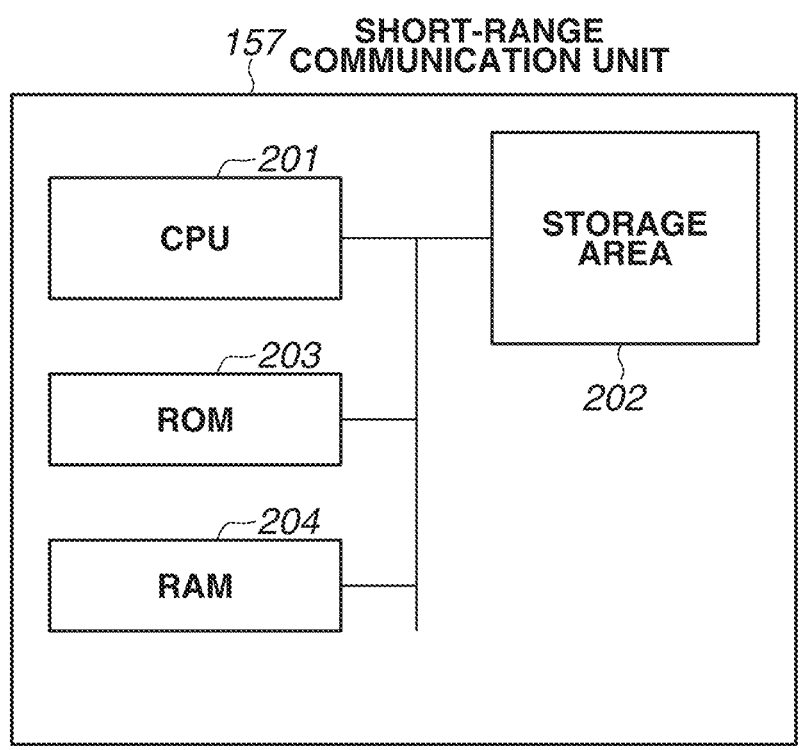
FIG. 2 is a block diagram illustrating a configuration of a short-range communication unit included in the communication apparatus according to the exemplary embodiment.

FIG. 2 illustrates the details of the short-range communication unit 157. The short-range communication unit 157 is a component for wirelessly connecting to an apparatus such as the information processing apparatus 101 over a short range. In the present exemplary embodiment, as the communication method of the short-range communication unit 157, BLE is used. Thus, the short-range communication unit 157 communicates with another short-range communication unit through GATT communication defined by the BLE standard. The short-range communication unit 157 and the CPU 154 communicate with each other via a bus interface such as Inter-Integrated Circuit (I2C). Further, the short-range communication unit 157 includes a CPU 201, a storage area 202, a ROM 203, and a RAM 204. The storage area 202 is a storage area accessible by the CPU 154. Further, the storage area 202 is accessible also by the information processing apparatus 101 via the short-range communication unit 110. The RAM 204 includes a DRAM, which requires a backup power supply. In the RAM 204, data is held by supplying power for data backup (not illustrated). Thus, the RAM 204 can store important data such as a program control variable without volatilizing the data. Further, the RAM 204 is used also as a main memory and a work memory for the CPU 201. The ROM 203 stores fixed data such as control programs to be executed by the CPU 201, a data table, and an OS program. The short-range communication unit 110 may also have a configuration similar to that of the short-range communication unit 157.

To the communication apparatus 151, a memory such as an external hard disk drive (HDD) or a Secure Digital (SD) card may be attached as an option device. Information saved in the communication apparatus 151 may also be saved in this memory.

Further, based on the state of the supply of power from a power supply (not illustrated), the communication apparatus 151 operates in any of four power states including a normal operating state (a software-on state), a hardware-off state, a software-off state, and a sleep state. The magnitude relationships between the power saving effects of the respective states are such that the normal operating state<the sleep state<the software-off state<the hardware-off state. The states other than the normal operating state (i.e., the sleep state, the software-off state, and the hardware-off state) are referred to as "power saving states". The term "first state" is used to address any of the power saving states. The term "second state" is used to address the normal operating state. Thus, the power consumption for a first state (power saving state) is smaller than in a second state (normal operating state).

The normal operating state is the state where programs of the communication apparatus 151 are operating, and power is supplied to the components of the communication apparatus 151 as normal (power saving control is not executed on the components). The communication apparatus 151 can execute main functions of the communication apparatus 151, such as a print function and a scan function, only if the communication apparatus 151 is in the normal operating state. The shifting from another state to the normal operating state is executed, for example, if a power button (not illustrated) is pressed with the communication apparatus 151 in the software-off state, or if a predetermined command is transmitted from the information processing apparatus 101. Further, in the present exemplary embodiment, this shifting is executed also by control described below in FIG. 5.

The hardware-off state is the state where power is not supplied from the power supply to the components of the communication apparatus 151. The shifting from another state to the hardware-off state is executed, for example, if a plug (not illustrated) is detached from a mains electricity outlet. The software-off state is the state where power saving control is executed on at least some of the components of the communication apparatus 151, and a main program of the communication apparatus 151 is not operating. The power saving control is, for example, control for stopping the supply of power and clocks, or supplying less power and fewer clocks than those in the normal state. Specifically, the software-off state is, for example, the state where power saving control is executed on the display unit 160, and a screen cannot be displayed on the display unit 160.

The software-off state is, for example, the state where power saving control is executed on the communication unit 156, and wireless LAN communication and changes in settings regarding wireless LAN communication (a communication setting process) cannot be executed. Further, the software-off state is, for example, the state where power saving control is executed on a server for providing a remote user interface (UI) function for the information processing apparatus 101, and the remote UI function cannot be provided for the information processing apparatus 101. The remote UI function is a function for remotely performing the display of information regarding the state of the communication apparatus 151 and changes in settings of the communication apparatus 151 (a communication setting process), using the information processing apparatus 101. In other words, the remote UI function is the function of displaying on the information processing apparatus 101 a remote operation screen for remotely operating the communication apparatus 151. In the present exemplary embodiment, also in the software-off state, the communication apparatus 151 supplies power to the short-range communication unit 157, and the short-range communication unit 157 can communicate. The shifting from another state to the software-off state is executed, for example, if the power button (not illustrated) is pressed in a state where the communication apparatus 151 is in the normal operating state. Further, this shifting is executed, for example, if an automatic power-off function, which is the function of shifting the communication apparatus 151 to the software-off state in a case where a user operation is not received for a predetermined time or more, is enabled, and a condition for executing this function is satisfied.

Figure 5:
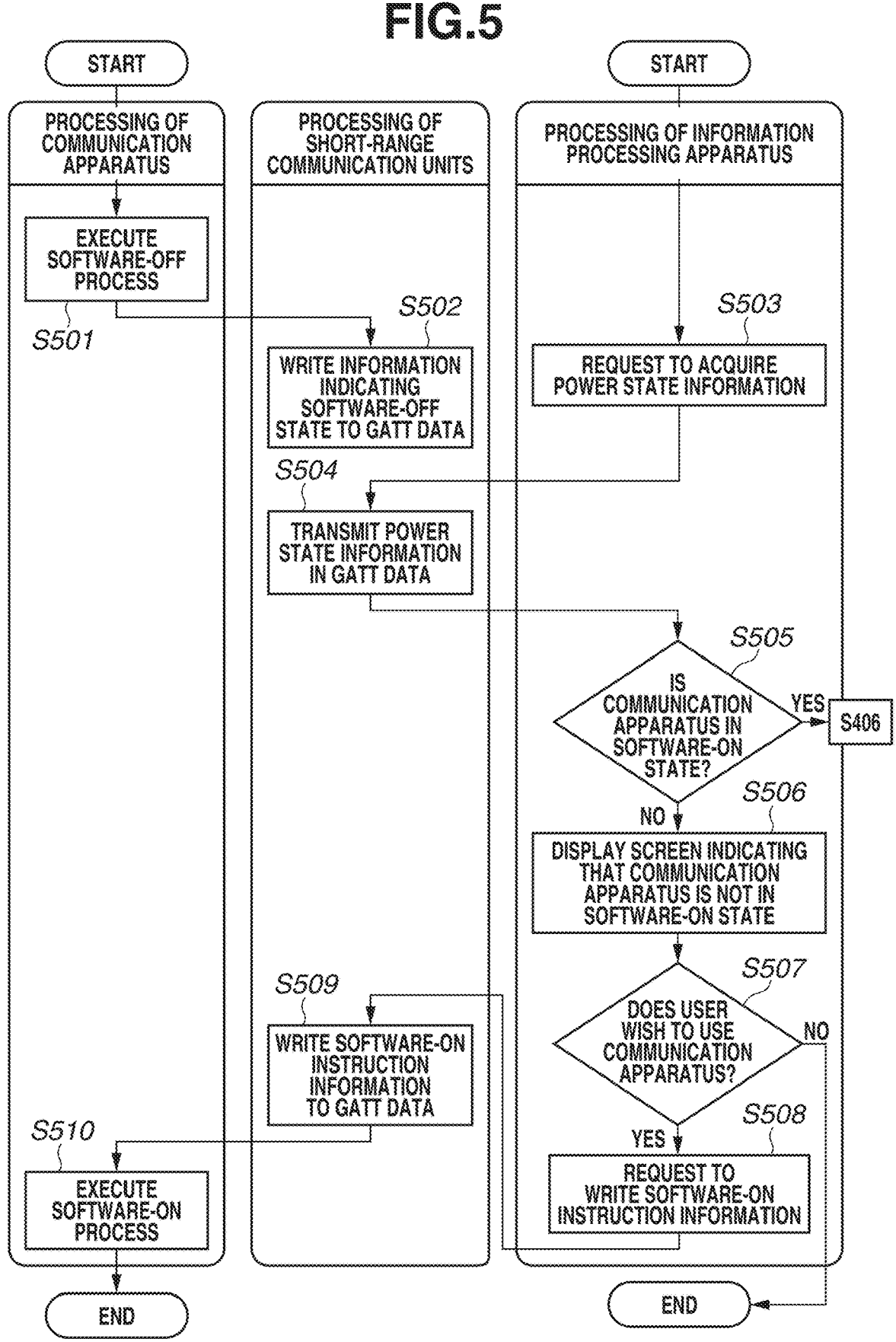
FIG. 5 is a flowchart illustrating processing executed by the communication apparatus and the information processing apparatus in a case where the communication apparatus is in a software-off state.

The sleep state is the state where power saving control is executed on at least some of the components of the communication apparatus 151, and the main program of the communication apparatus 151 is operating. The shifting from another state to the sleep state is executed, for example, if a user operation is not received for a predetermined time or more. The number of components subjected to power saving control in the software-off state is greater than the number of components subjected to power saving control in the sleep state, and the power saving effect of the software-off state is greater than that of the sleep state. Further, in the present exemplary embodiment, if receiving any user operation, the communication apparatus 151 shifts to the normal operating state in the sleep state. In the software-off state, however, the communication apparatus 151 shifts to the normal operating state only if a particular user operation or processing described below in FIG. 5 is performed. The communication apparatus 151 may operate in power states other than the above four power states, such as intermediate states between these power states.

At this time, as an example, the allocation of processing between the information processing apparatus 101 and the communication apparatus 151 is as illustrated above, but is not particularly limited to this allocation form, and may be another form.

In the present exemplary embodiment, the short-range communication unit 157 functions as an advertiser (or a slave) for broadcasting advertisement information, and the short-range communication unit 110 functions as a scanner (or a master) for receiving the advertisement information.

A description is given of the processes of transmitting advertisement information and receiving a request to start GATT communication in the BLE standard. In the present exemplary embodiment, since the short-range communication unit 157 operates as a slave device as described above, the short-range communication unit 157 performs the above processes.

Figure 11:
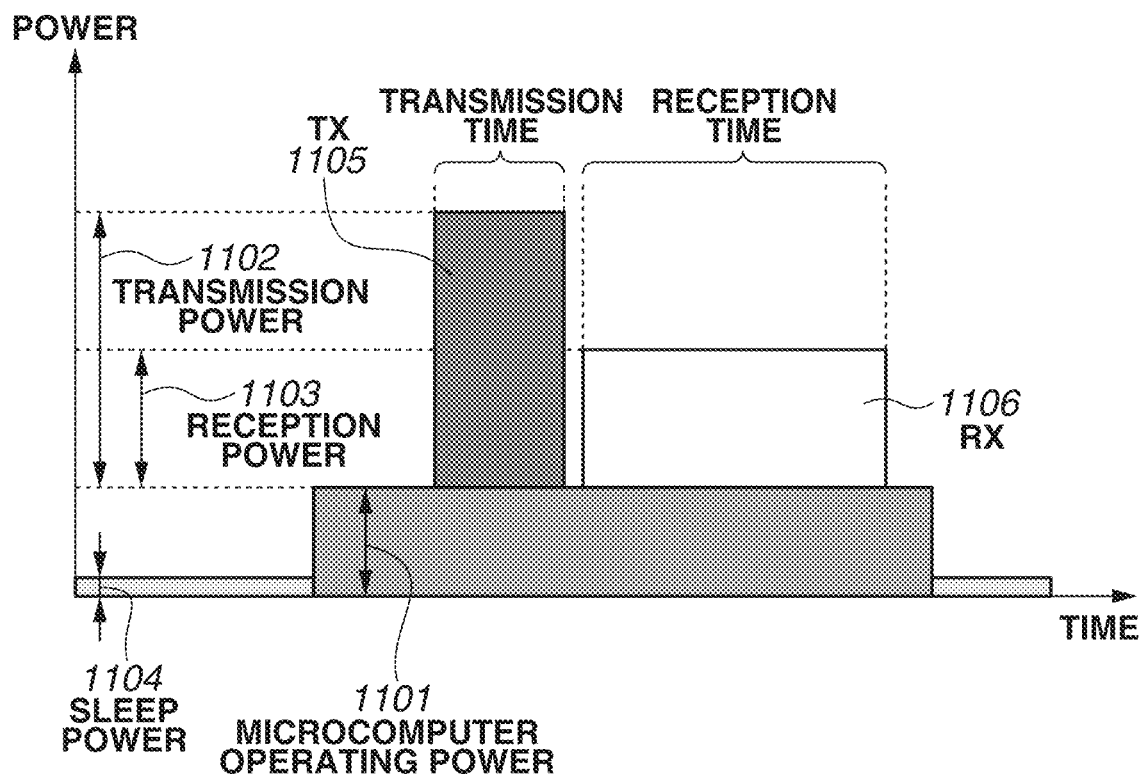
FIG. 11 is a diagram illustrating power consumption of the short-range communication unit.

The short-range communication unit 157 communicates by dividing the 2.4 GHz frequency band into 40 channels (channels 0 to 39). The short-range communication unit 157 uses the 37th to 39th channels for the transmission of advertisement information and the reception of a request to start GATT communication, and uses the 0th to 36th channels for data communication (GATT communication) after a BLE connection is established. In FIG. 11, a vertical axis indicates the power consumption of the short-range communication unit 157, and a horizontal axis indicates time.

FIG. 11 illustrates power consumption in each process when advertisement information is transmitted using a single channel. Tx 1105 indicates total power consumption in a transmission process, which is the process of broadcasting advertisement information. Rx 1106 indicates total power consumption in a reception process, which is the process of maintaining an enabled state of a receiver for receiving a request to start GATT communication. Transmission power 1102 indicates instantaneous power consumption in the transmission process. Further, reception power 1103 indicates instantaneous power consumption in the reception process. Further, microcomputer operating power 1101 indicates instantaneous power consumption in a case where a microcomputer in the short-range communication unit 157 operates. The reason why the microcomputer operates before, after, and between the Tx 1105 and the Rx 1106 is that the microcomputer needs to be started in advance to execute and stop the transmission and reception processes. Further, in a case where advertisement information is transmitted through a plurality of channels, the power consumption increases by the number of channels through which the advertisement information is transmitted. Further, while the microcomputer does not operate, and the short-range communication unit 157 is in the power saving state, sleep power 1104 is the instantaneous power consumption of the short-range communication unit 157. The sleep power 1104 is power consumed by the short-range communication unit 157 in a power saving time in FIG. 12. As described above, the short-range communication unit 157 performs the transmission process using predetermined channels and then performs the reception process for a certain time using the same channels, thereby waiting for the transmission of a request to start GATT communication from the information processing apparatus 101.

Figure 12:
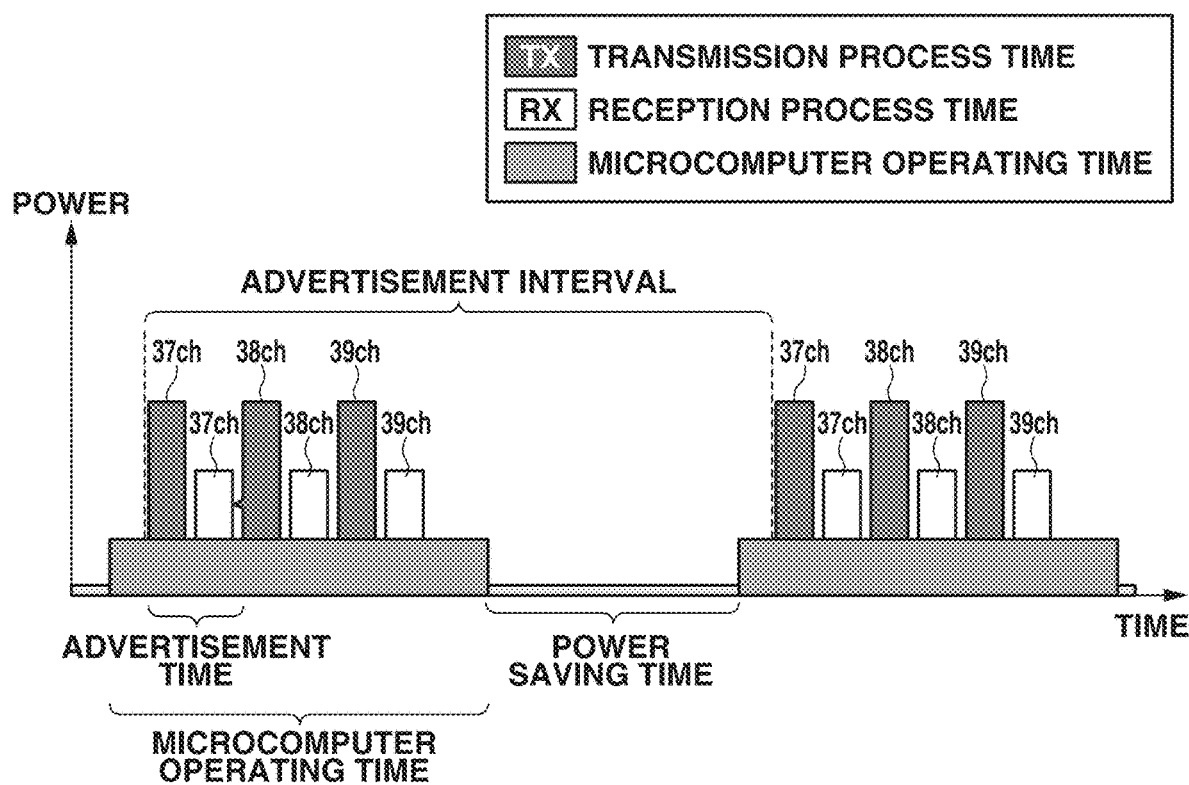
FIG. 12 is a diagram illustrating a transmission process for transmitting advertisement information and a reception process, which are performed by the short-range communication unit.

Further, as illustrated in FIG. 12, the short-range communication unit 157 repeats the transmission process for transmitting advertisement information and the reception process three times through each channel, then stops the operation of the microcomputer, and shifts to and remains in the power saving state for a certain time. Hereinafter, the combination of the transmission process for transmitting advertisement information and the reception process through predetermined channels will be referred to as an "advertisement". Further, the time intervals at which the advertisement information is transmitted through the predetermined channels will be referred to as "advertisement intervals". As described above, the short-range communication unit 157 shifts to the power saving state at each advertisement interval and thereby can continue to operate by reducing power consumption. The number of advertisements to be repeated from when the short-range communication unit 157 performs the first advertisement to when the short-range communication unit 157 shifts to the power saving state can be arbitrarily changed up to three.

Figure 13:
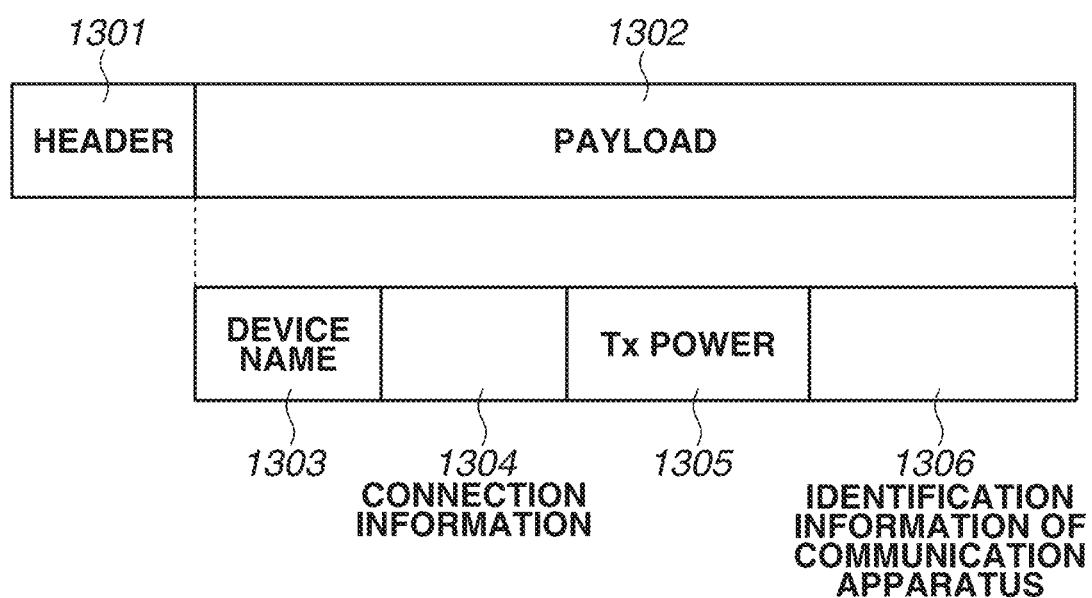
FIG. 13 is a diagram illustrating an example of a structure of advertisement information to be broadcast from the short-range communication unit to a periphery of the communication apparatus.

FIG. 13 is an example of the structure of advertisement information to be broadcast from the short-range communication unit 157 to the vicinity of the communication apparatus 151.

If the supply of power to the short-range communication unit 157 is started, the short-range communication unit 157 performs an initialization process and shifts to an advertising state. If shifting to the advertising state, the short-range communication unit 157 periodically broadcasts advertisement information to the vicinity of the communication apparatus 151 based on the advertisement intervals. The advertisement information is a signal including basic header information (identification information for identifying an apparatus that transmits the advertisement information) and includes a header 1301 and a payload 1302. The information processing apparatus 101 receives this advertisement information and thereby can recognize the presence of the communication apparatus 151. Further, the information processing apparatus 101 transmits a request to start GATT communication to the communication apparatus 151 and thereby can make a BLE connection with the communication apparatus 151. The header 1301 is an area for storing information such as the type of the advertisement information and the size of the payload 1302. The payload 1302 stores information such as a device name 1303 or installation profile information as identification information, connection information 1304 for making a BLE connection with the communication apparatus 151, and transmission power (Tx power) 1305 for the advertisement information. The advertisement information may include communication apparatus identification information 1306. The communication apparatus identification information 1306 corresponds to the media access control (MAC) address of the communication apparatus 151, service information of the communication apparatus 151, and the Service Set Identifier (SSID) and the password of the access point in the communication apparatus 151. The advertisement information may include various pieces of information other than the above information. The outline of GATT communication in the BLE standard is described. GATT is a profile for governing the reading and writing (transmission and reception) of information in the BLE standard.

In GATT communication, two roles including a GATT client and a GATT server are defined based on the transfer source and the transfer destination of data.

The GATT client transmits a request to the GATT server and receives a response from the GATT server. In the present exemplary embodiment, the information processing apparatus 101 is the GATT client. The GATT client can read information held in a storage area in a short-range communication unit of the GATT server and write information to the storage area.

If receiving a request from the GATT client, the GATT server returns a response to the GATT client. In the present exemplary embodiment, the communication apparatus 151 is the GATT server. The GATT server operates as a device for storing information such as state information of the GATT server.

Figure 3:
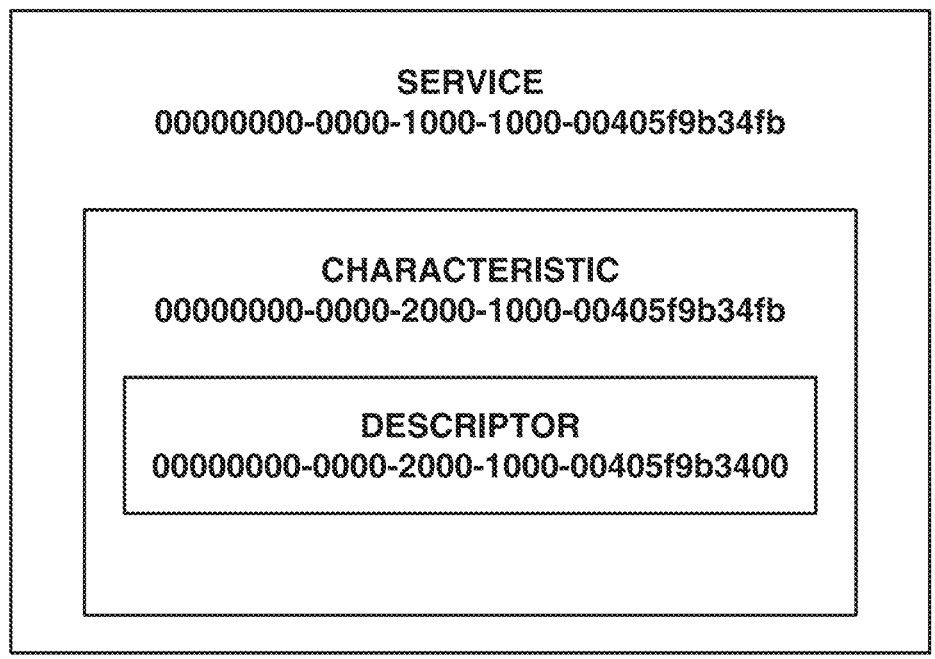
FIG. 3 is a diagram illustrating a data format of Generic Attribute Profile (GATT).

Next, the data format of GATT is described. GATT data has a hierarchical structure as illustrated in FIG. 3 and includes three elements termed a service, a characteristic, and a descriptor. The descriptor, however, may not be present. Each of the service, the characteristic, and the descriptor can be identified by a universally unique identifier (UUID) represented in 32 digits. The "UUID" as used herein is an identifier for uniquely identifying an object on software. The UUID has a 128-bit numerical value, but normally, is represented hexadecimally as "550e8400-e29b-41d4-a716-446655440000", for example. There are services, characteristics, and descriptors defined by the Bluetooth Special Interest Group (SIG) standard and specific to a vendor. The UUID of a service, a characteristic, or a descriptor specific to a vendor is represented in 32 digits as described above. The UUID of a service, a characteristic, or a descriptor defined by the Bluetooth SIG standard is represented in four digits. That is, the UUID of a service, a characteristic, or a descriptor defined by the Bluetooth SIG standard is represented as "2A49", for example.

Services are obtained by grouping attributes in the GATT data into common classifications. Each service includes one or more characteristics. For each characteristic, a single value is set. For a descriptor, an attribute value used when additional information is necessary for a characteristic is set. For each of a service, a characteristic, and a descriptor, a read/write attribute can be set, which is a setting value indicating whether the GATT client is permitted to read and write the corresponding element.

The GATT client specifies the UUID of each of a service and a characteristic and thereby can read and write a value set for the specified characteristic. However, the determination of whether the value can be read and written is based on the read/write attribute set for each of the service and the characteristic.

In the present exemplary embodiment, authentication is performed between the short-range communication units included in the respective apparatuses, and a pairing process for reading and writing data between the apparatuses through GATT communication is performed. The GATT communication is communication in which the information processing apparatus 101 functions as a GATT client, the communication apparatus 151 functions as a GATT server, the information processing apparatus 101 reads and writes information from and to the communication apparatus 151 based on a GATT-based profile. The configuration is such that in the state where the information processing apparatus 101 and the communication apparatus 151 are not paired together, the communication apparatus 151 does not permit the reading and writing of information through GATT communication. In this manner, it is possible to avoid the situation where the information processing apparatus 101 and the communication apparatus 151 that are not paired together communicate with each other, and for example, information held in the communication apparatus 151 is inadvertently acquired by the information processing apparatus 101 that is not paired with the communication apparatus 151.

Figure 10A:
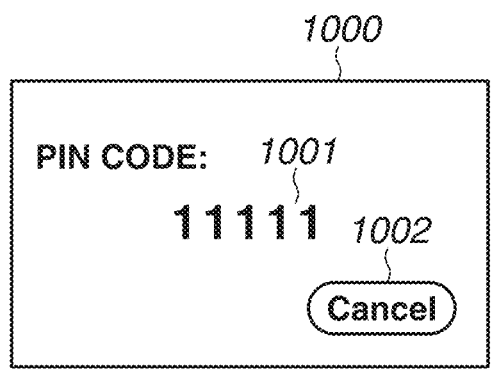
FIGS. 10A and 10B are diagrams illustrating examples of screens displayed when a pairing process is performed.
Figure 10B:
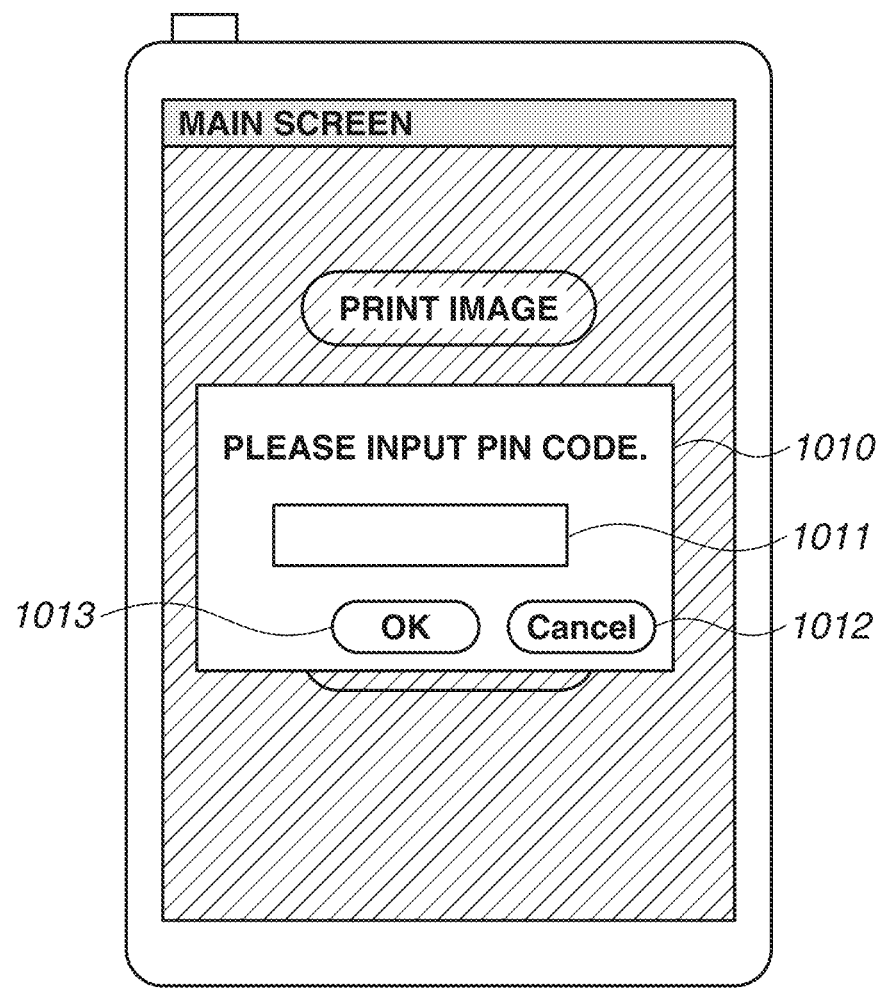

The details of the pairing process are described. First, the information processing apparatus 101 starts the print application. Then, if the display unit 108 displays an initial screen (a home screen) to be displayed by the print application, the information processing apparatus 101 starts searching for advertisement information including particular apparatus information. The particular apparatus information is, for example, the UUID or the MAC address of an apparatus (a printer) corresponding to the print application. Then, if receiving advertisement information including particular apparatus information, the information processing apparatus 101 transmits a BLE connection request (CONNECT_REQ) to the apparatus having transmitted this advertisement information (the communication apparatus 151 in this case), and the apparatuses establish a BLE connection with each other. Then, if pairing with the communication apparatus 151 is not completed, the information processing apparatus 101 displays on the display unit 108 a screen for urging a user to perform pairing. Then, if instructed by the user to execute pairing, the information processing apparatus 101 transmits a pairing request to the communication apparatus 151 through communication based on the Security Manager Protocol (SMP). The apparatuses communicate with each other based on the SMP until the pairing ends. If receiving the pairing request, the communication apparatus 151 displays on the display unit 160 a personal identification number (PIN) code display screen 1000 as illustrated in FIG. 10A. On the PIN code display screen 1000, a PIN code 1001 and a "cancel" button 1002 for cancelling the pairing process are displayed. Then, if transmitting the pairing request, the information processing apparatus 101 displays on the display unit 108 a PIN code input screen 1010 as illustrated in FIG. 10B. On the PIN code input screen 1010, a PIN code input area 1011, an "OK" button 1013, and a "cancel" button 1012 are displayed. The PIN code input area 1011 is an area for receiving the input of the PIN code 1001 from the user. The "OK" button 1013 is a button for transmitting the input PIN code 1001 to the communication apparatus 151. The "cancel" button 1012 is a button for cancelling the pairing process. If the "OK" button 1013 is pressed in the state where the PIN code 1001 is input to the PIN code input area 1011, the information processing apparatus 101 transmits information including the input PIN code 1001 to the communication apparatus 151 through communication based on the SMP. The communication apparatus 151 determines whether the PIN code 1001 included in the received information coincides with the PIN code 1001 displayed on the PIN code display screen 1000. If it is determined that the PIN codes 1001 coincide with each other, the communication apparatus 151 permits the information processing apparatus 101 to be paired with the communication apparatus 151. Specifically, the communication apparatus 151 transmits a link key created by a predetermined method based on the PIN code 1001 to the information processing apparatus 101, using the SMP of the BLE standard. The link key is thus saved in each of a storage area (the ROM 104) included in the information processing apparatus 101 and a storage area (the ROM 152) included in the communication apparatus 151. Consequently, the pairing is completed, and the apparatuses are permitted to execute BLE communication with each other. If the pairing is completed, the information processing apparatus 101 hides the PIN code display screen 1000 and displays the previous screen again.

After the pairing is completed, when transmitting a GATT communication request to the communication apparatus 151, the information processing apparatus 101 notifies the communication apparatus 151 of the link key saved in the storage area of the information processing apparatus 101 when the pairing process is performed. If receiving the GATT communication request, the communication apparatus 151 compares the link key saved in the storage area of the communication apparatus 151 when the pairing process is performed, with the notified link key, thereby confirming whether the apparatus having transmitted the GATT communication request is the apparatus paired with the communication apparatus 151. Then, if it is confirmed that the apparatus having transmitted the GATT communication request is the apparatus paired with the communication apparatus 151, the communication apparatus 151 permits the reading and writing of information with the information processing apparatus 101 through GATT communication. Consequently, once the information processing apparatus 101 completes the pairing process with the communication apparatus 151, then from this point onward, the information processing apparatus 101 can execute GATT communication with the communication apparatus 151 without the user inputting the PIN code 1001. A description has been given of the form in which the user inputs the PIN code 1001 displayed on the PIN code display screen 1000 to the PIN code input area 1011. The present exemplary embodiment, however, is not limited to this form. The form may be such that the PIN code 1001 is stored in the information processing apparatus 101 together with the installation of the print application. Consequently, the communication apparatus 151 is notified of the PIN code 1001 without the user inputting the PIN code 1001. Further, the timing when the pairing process is started is not limited to that in the above form, and may be the timing when the user gives an instruction to perform printing via the print application, or the timing before a BLE connection is made by a connection setting process.

The problems to be solved by the present invention are described in detail. As described above, the communication apparatus 151 according to the present exemplary embodiment can operate in the software-off state. Further, if the communication apparatus 151 is in the software-off state, for example, power may not be supplied to some of the components of the communication apparatus 151, and the communication apparatus 151 may not be able to execute some of the functions. According to this, the following problem arises in a case where the communication apparatus 151 is in the software-off state. For example, if the communication apparatus 151 is in the software-off state, the CPU 154 cannot acquire information regarding the components to which power is not supplied. Thus, if this information is updated after GATT data is constructed, the CPU 154 cannot cause the information processing apparatus 101 to read the latest information. Further, if, based on information read by the information processing apparatus 101 through BLE communication, receiving from the information processing apparatus 101 a request to perform processing using the components to which power is not supplied, the CPU 154 cannot execute this processing in the state where the communication apparatus 151 remains in the software-off state.

In response, in the present exemplary embodiment, if the communication apparatus 151 is in the software-off state, the information processing apparatus 101 is prevented from using predetermined information that can be acquired through BLE communication. Specifically, in the present exemplary embodiment, if the communication apparatus 151 is in the software-off state, control is performed so that the information processing apparatus 101 does not acquire the predetermined information through BLE communication. The predetermined information is, for example, information regarding wireless LAN settings. Further, the information regarding wireless LAN settings is, for example, the SSID and the password of the access point in the communication apparatus 151 and the Internet Protocol (IP) address of the communication apparatus 151. Alternatively, the information regarding wireless LAN settings may be, for example, a list of access points to which the communication apparatus 151 can connect, the SSID and the password of an access point to which the communication apparatus 151 is connected, and information indicating whether the access point in the communication apparatus 151 is enabled or disabled.

When wireless LAN settings are made, the communication apparatus 151 according to the present exemplary embodiment displays a predetermined screen on the display unit 160. The predetermined screen is, for example, a screen indicating that a wireless LAN setting process is being executed, a screen including a "cancel" button for suspending the process that is being executed, or a screen indicating that the communication apparatus 151 is being remotely operated by the information processing apparatus 101. Further, if the communication apparatus 151 according to the present exemplary embodiment is in the software-off state, power saving control is executed on the display unit 160. Thus, the display unit 160 cannot display the predetermined screen. Thus, if the communication apparatus 151 is in the software-off state, and if power is supplied to the communication unit 156, the communication apparatus 151 can make wireless LAN settings themselves, but cannot display the predetermined screen on the display unit 160. Thus, in the present exemplary embodiment, if the communication apparatus 151 is in the software-off state, control is performed so that the above information is not acquired by the information processing apparatus 101, whereby the display unit 160 is not used. Further, there is also a form in which, for example, if the communication apparatus 151 is in the software-off state, power saving control is executed on the communication unit 156. In this form, even if the communication apparatus 151 receives an execution request to execute wireless LAN communication from the information processing apparatus 101, the communication apparatus 151 cannot execute wireless LAN communication. Thus, if the communication apparatus 151 is in the software-off state, control is performed so that the above information is not acquired by the information processing apparatus 101, whereby the communication unit 156 is not used.

Figure 4:
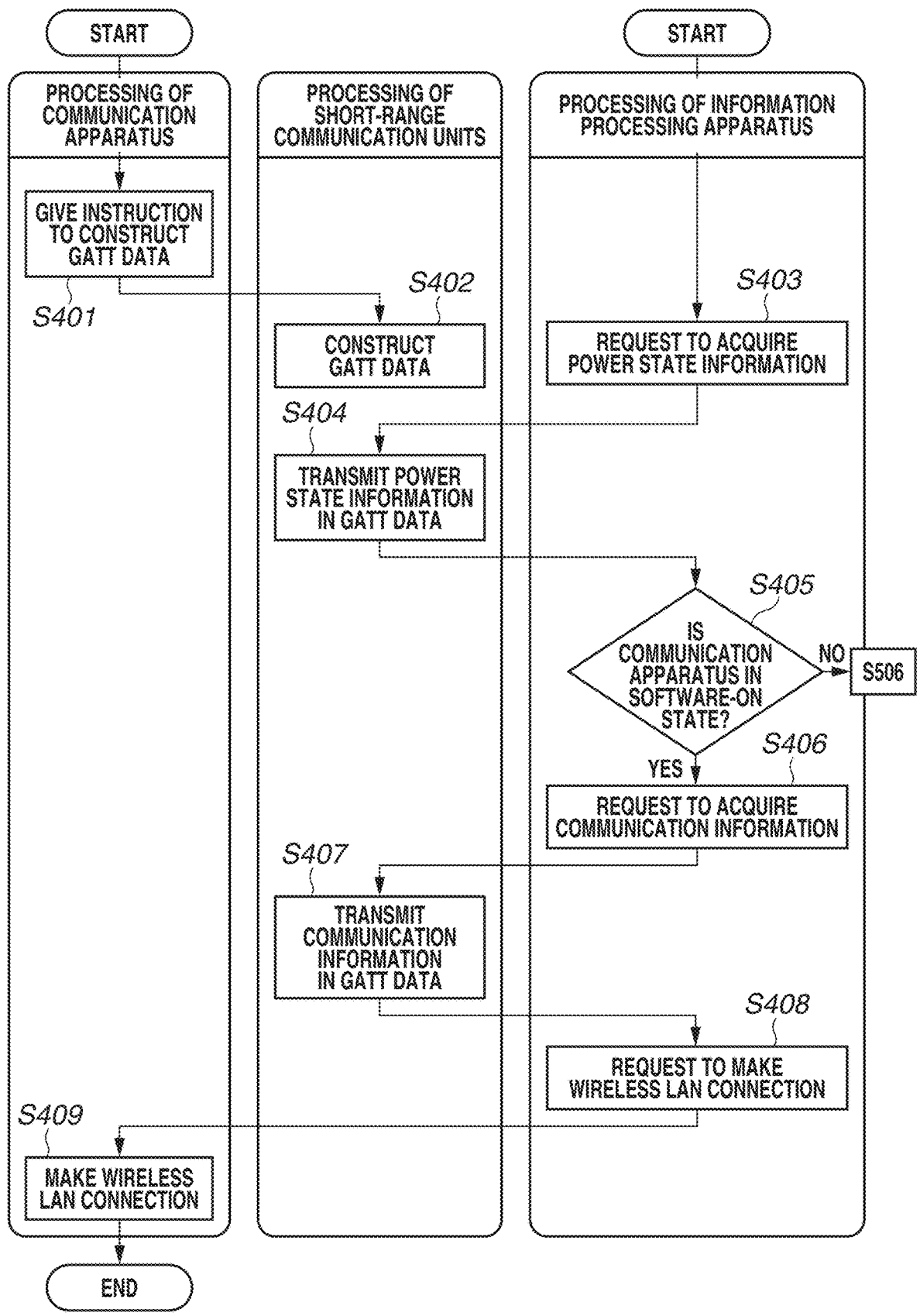
FIG. 4 is a flowchart illustrating processing executed by the communication apparatus and the information processing apparatus in a case where the communication apparatus is in a software-on state.

The predetermined information is not limited to the above information, and may only need to be information that cannot be acquired if the communication apparatus 151 is in the software-off state, or information regarding a function that cannot be executed if the communication apparatus 151 is in the software-off state. For example, the predetermined information may be information of a main body error state. This is because, for example, if the communication apparatus 151 is in the software-off state, power saving control is executed on a detection unit (not illustrated) for detecting a main body error state, and the communication apparatus 151 cannot acquire the latest detection result by the detection unit. The main body error state is, for example, the state where a cover included in the communication apparatus 151 is opened, the state where a paper jam is occurring, or the state where the amount of remaining recording agent or the number of remaining recording media is small. Alternatively, the predetermined information may be, for example, information of the amount of remaining recording agent (ink or toner), information of the attachment state of a recording agent storage portion (an ink tank or a toner cartridge). This is because, for example, power saving control is executed on a detection unit (not illustrated) for detecting the amount of remaining recording agent or a detection unit (not illustrated) for detecting the attachment state of the recording agent storage portion, and the communication apparatus 151 cannot acquire the latest detection result by the detection unit. Yet alternatively, the predetermined information may be, for example, information (an access token or a uniform resource locator (URL)) for executing a remote UI function. This is because if the communication apparatus 151 is in the software-off state, power saving control is executed on a hardware component (not illustrated) for providing information for executing the remote UI function. Yet alternatively, the predetermined information may be, for example, information regarding a screen displayed on the display unit 160. This is because if the communication apparatus 151 is in the software-off state, power saving control is executed on the display unit 160. With reference to FIGS. 4 and 5, processing according to the present exemplary embodiment is described.

FIG. 4 is a flowchart illustrating processing executed by the communication apparatus 151 and the information processing apparatus 101 via the short-range communication unit 110 and the short-range communication unit 157 in a case where the apparatus state of the communication apparatus 151 is the normal operating state (the software-on state). Further, FIG. 4 is a flowchart illustrating processing in which the communication apparatus 151 and the information processing apparatus 101 exchange communication information through short-range wireless communication to perform wireless LAN communication using wireless communication units. Actually, the processing executed by each apparatus in the flowchart in FIG. 4 is achieved by the CPU of the apparatus loading various programs stored in a storage area such as the ROM or the RAM of the apparatus into the RAM of the apparatus and executing the loaded programs. Further, the processes of step S401 and thereafter in the flowchart in FIG. 4 are started, for example, if the communication apparatus 151 shifts to the normal operating state. The timing when the processes of step S401 and thereafter are executed is not limited to the above timing. The processes of step S401 and thereafter may be appropriately executed to update GATT data. Further, the processes of step S403 and thereafter in the flowchart in FIG. 4 are started, for example, if an operation for communicating with the communication apparatus 151 is performed via a predetermined application (the print application) installed in the information processing apparatus 101. The operation for communicating with the communication apparatus 151 is the operation of pressing a predetermined button on a screen displayed by the predetermined application installed in the information processing apparatus 101. Further, the processes of step S403 and thereafter in the flowchart in FIG. 4 are started in the state where the pairing process is executed. Further, the processes of step S403 and thereafter in the flowchart in FIG. 4 are started in the state where the processes of steps S401 and S402 in FIG. 4 are executed, and GATT data is constructed.

In step S401, the communication apparatus 151 instructs the short-range communication unit 157 to construct GATT data as illustrated in FIG. 6. In the GATT data in FIG. 6, "service UUID" indicates a UUID assigned to each service. "Service name" indicates the name of each service. "Characteristic UUID" indicates a UUID assigned to each characteristic. "Characteristic name" indicates the name of each characteristic. "Service readable" indicates whether the information processing apparatus 101 can read a value regarding each service. "Service writable" indicates whether the information processing apparatus 101 can write a value regarding each service. "Characteristic readable" indicates whether the information processing apparatus 101 can read a value regarding each characteristic. "Characteristic writable" indicates whether the information processing apparatus 101 can write a value regarding each characteristic. If "service readable" indicates that a value can be read (o), and "characteristic readable" indicates that a value can be read (o), the information processing apparatus 101 can read a value regarding the corresponding characteristic. Further, if "service readable" indicates that a value can be read (o), and "characteristic readable" indicates that a value cannot be read (blank), the information processing apparatus 101 cannot read a value regarding the corresponding characteristic. "Value" indicates a value set for each characteristic.

In step S402, the short-range communication unit 157 constructs GATT data with a content based on the instruction received in step S401. The constructed GATT data is saved in the storage area 202 of the short-range communication unit 157. At this time, the communication apparatus 151 is in the software-on state. Thus, when the construction of the GATT data is completed, information indicating that the communication apparatus 151 is in the software-on state is written to an area included in the GATT data and indicating the power state of the communication apparatus 151 (a storage area for power state information). Hereinafter, the information written in the area indicating the power state of the communication apparatus 151 will be referred to as "power state information of the communication apparatus 151". After the GATT data is constructed, the CPU 154 may write each value in the GATT data, thereby appropriately updating the GATT data.

In step S403, via the short-range communication unit 110, the information processing apparatus 101 requests the short-range communication unit 157 through GATT communication to acquire (read) the power state information of the communication apparatus 151. That is, the information processing apparatus 101 executes an acquisition process for acquiring information. Specifically, at this time, the information processing apparatus 101 specifies the UUIDs of a service and a characteristic corresponding to the power state information, thereby requesting the short-range communication unit 157 to acquire (read) the power state information. Before requesting the short-range communication unit 157 to acquire the power state information, the information processing apparatus 101 inquires about information of services and characteristics which the communication apparatus 151 is capable of dealing with, and thereby can acquire information of UUIDs to which the communication apparatus 151 corresponds. Acquiring this information, the information processing apparatus 101 references a table stored in a memory included in the information processing apparatus 101 and determines to which information the acquired UUIDs correspond. Consequently, the information processing apparatus 101 can specify the UUIDs corresponding to the information that the information processing apparatus 101 requests.

In step S404, the short-range communication unit 157 determines whether the information corresponding to the UUIDs specified by the information processing apparatus 101 in step S403 is present in the GATT data constructed in step S402. Further, the short-range communication unit 157 determines whether the reading of the service and the characteristic corresponding to the information is permitted. If the information corresponding to the specified UUIDs is present in the GATT data, and the reading of the service and the characteristic corresponding to the information is permitted, the short-range communication unit 157 transmits the information (the power state information) to the short-range communication unit 110. That is, the information processing apparatus 101 reads the power state information through GATT communication. If, on the other hand, the information corresponding to the specified UUIDs is not present in the GATT data, or the reading of the service and the characteristic corresponding to the information is not permitted, the short-range communication unit 157 does not transmit the information to the short-range communication unit 110. A case where the information corresponding to the specified UUIDs is not present in the GATT data is, for example, a case where the specified UUIDs are incorrect. Further, the determination of whether the reading of the service and the characteristic corresponding to the information is permitted can be made by referencing the items "service readable" and "characteristic readable" in the GATT data.

In step S405, the information processing apparatus 101 confirms the content of the power state information acquired in step S404 and determines whether the power state of the communication apparatus 151 is the software-on state. If the power state of the communication apparatus 151 is the software-on state (YES in step S405), the information processing apparatus 101 determines that the functions of the communication apparatus 151 operate. Then, the information processing apparatus 101 executes the processes of step S406 and thereafter. If, on the other hand, the power state of the communication apparatus 151 is not the software-on state (NO in step S405), the information processing apparatus 101 determines that most of the functions of the communication apparatus 151 do not operate. Then, the information processing apparatus 101 executes the processes of step S506 and thereafter illustrated in FIG. 5. The processing to be performed in a case where the apparatus state of the communication apparatus 151 is not the software-on state will be described in detail with reference to FIG. 5.

In step S406, via the short-range communication unit 110, the information processing apparatus 101 requests the short-range communication unit 157 through GATT communication to acquire (read) communication information for communicating with the communication apparatus 151 via the communication unit 109. Specifically, at this time, the information processing apparatus 101 specifies the UUIDs of a service and a characteristic corresponding to the communication information, thereby requesting the short-range communication unit 157 to acquire (read) the communication information. At this time, the communication information is the SSID and the password of the access point in the communication apparatus 151. Further, the communication information is used when the information processing apparatus 101 performs wireless LAN communication with the communication unit 156 via the communication unit 109.

In step S407, the short-range communication unit 157 determines whether the information corresponding to the UUIDs specified by the information processing apparatus 101 in step S406 is present in the GATT data constructed in step S402. Further, the short-range communication unit 157 determines whether the reading of the service and the characteristic corresponding to the information is permitted. If the information corresponding to the specified UUIDs is present in the GATT data, and the reading of the service and the characteristic corresponding to the information is permitted, the short-range communication unit 157 transmits the information (the communication information in this case) to the short-range communication unit 110. That is, the information processing apparatus 101 reads the communication information through GATT communication. If, on the other hand, the information corresponding to the specified UUIDs is not present in the GATT data, or the reading of the service and the characteristic corresponding to the information is not permitted, the short-range communication unit 157 does not transmit the information to the short-range communication unit 110.

In step S408, using the communication information acquired in step S407, the information processing apparatus 101 transmits a connection request for wireless LAN communication (a request to make a wireless LAN connection) to the communication unit 156 via the communication unit 109. At this time, a password for executing wireless LAN communication is transmitted to the communication unit 156.

In step S409, based on the password transmitted in step S408, the communication apparatus 151 determines whether a wireless LAN connection with the information processing apparatus 101 is permitted based on the request transmitted to the communication unit 156 in step S408. If it is determined that a wireless LAN connection is not permitted, for example, because the password is incorrect, the communication apparatus 151 does not establish a wireless LAN connection, and the processing is ended. Then, if it is determined that a wireless LAN connection is permitted, the communication apparatus 151 establishes a wireless LAN connection with the information processing apparatus 101. Specifically, at this time, a direct connection is established between the communication unit 109 and the access point in the communication apparatus 151.

A description has been given of the form in which the user instructs the information processing apparatus 101 to make a direct connection, and a direct connection is established based on the communication information transmitted and received via the short-range communication units. Alternatively, for example, a wireless LAN connection in a connection form other than a direct connection, such as an infrastructure connection, may be established. Consequently, from this point onward, the information processing apparatus 101 and the communication apparatus 151 can execute wireless LAN communication with each other. If the user instructs the information processing apparatus 101 to make an infrastructure connection, for example, the information processing apparatus 101 acquires from the communication apparatus 151 a list of access points to which the communication apparatus 151 can connect through GATT communication. Further, then, the information processing apparatus 101 connects to any of the access points among the list and also writes the SSID and the password of the access point to be used in the infrastructure connection to the storage area 202 through GATT communication. Consequently, the information processing apparatus 101 and the communication apparatus 151 can execute wireless LAN communication through the infrastructure connection.

For example, the processing illustrated in FIG. 4 may be executed in the state where image data to be transmitted to the communication apparatus 151 is selected by a predetermined application installed in the information processing apparatus 101. In this case, the selected image data is transmitted to the communication apparatus 151 through the wireless LAN connection established in step S409. Further, the communication apparatus 151 executes printing based on the transmitted image data.

FIG. 5 is a flowchart illustrating processing executed by the communication apparatus 151 and the information processing apparatus 101 via the short-range communication unit 110 and the short-range communication unit 157 in a case where the power state of the communication apparatus 151 is the software-off state in the present exemplary embodiment. Actually, the processing executed by each apparatus is achieved by the CPU of the apparatus loading various programs stored in a storage area such as the ROM or the RAM of the apparatus into the RAM of the apparatus and executing the loaded programs. Further, the processes of step S501 and thereafter in the flowchart in FIG. 5 are started, for example, if a condition for executing a software-off process is satisfied. Examples of the condition for executing the software-off process include the fact that a predetermined user operation for shifting the communication apparatus 151 to the software-off state is performed, and the fact that the state where the communication apparatus 151 does not execute a predetermined process continues for a predetermined time or more. Further, the processes of step S503 and thereafter in the flowchart in FIG. 5 are started, for example, if an operation for communicating with the communication apparatus 151 is performed via the print application. Further, the processes of step S503 and thereafter in the flowchart in FIG. 5 are started in the state where the pairing process is executed. Further, the processes of step S503 and thereafter in the flowchart in FIG. 5 are started in the state where the processes of steps S501 and S502 in FIG. 5 are executed, and GATT data is constructed.

In step S501, the communication apparatus 151 executes the software-off process and shifts the power state to the software-off state. At this time, before the software-off process is executed, the communication apparatus 151 and the short-range communication unit 157 give and receive the instruction to construct GATT data in step S401, and execute the GATT data construction process in step S402. That is, GATT data as illustrated in FIG. 6 is already saved in the storage area 202 of the short-range communication unit 157. After executing the software-off process, the communication apparatus 151 instructs the short-range communication unit 157 to change the information stored in the storage area for the power state information in the GATT data to information indicating that the communication apparatus 151 is in the software-off state.

Receiving the instruction from the communication apparatus 151 in step S501, then in step S502, the short-range communication unit 157 writes, to the storage area for the power state information in the GATT data, information indicating that the communication apparatus 151 is in the software-off state.

The processes of steps S503 to S505 are similar to the processes of steps S403 to S405, and therefore are not described here. If the power state of the communication apparatus 151 is not the software-on state (NO in step S505), the information processing apparatus 101 determines in step S505 that most of the functions of the communication apparatus 151 do not operate. Then, the information processing apparatus 101 executes the processes of step S506 and thereafter.

Figure 14:
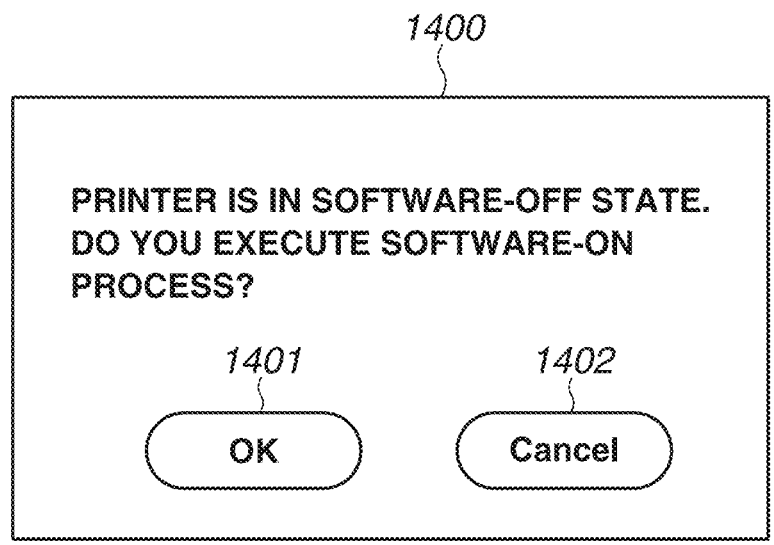
FIG. 14 is an example of a screen displayed by the information processing apparatus according to the exemplary embodiment.

In step S506, the information processing apparatus 101 displays on the display unit 108 a screen indicating that the communication apparatus 151 is not in the software-on state. That is, if the communication apparatus 151 is not in the software-on state, unlike the processing in a case where the communication apparatus 151 is in the software-on state, the information processing apparatus 101 does not request the short-range communication unit 157 to acquire the communication information. The screen displayed in step S506 may include, for example, an area indicating functions that cannot be executed in a case where the communication apparatus 151 is in the software-off state, or an input button for shifting the communication apparatus 151 to the software-on state. FIG. 14 illustrates an example of the screen displayed in step S506. A button 1401 is an input button for shifting the communication apparatus 151 to the software-on state. A button 1402 is an input button for not shifting the communication apparatus 151 to the software-on state.

In step S507, the information processing apparatus 101 determines whether an input for using the communication apparatus 151 is received from the user using the information processing apparatus 101. Specifically, for example, the information processing apparatus 101 determines whether an input for continuing to perform a wireless LAN setting process or an input for shifting the communication apparatus 151 to the software-on state (an operation on the button 1401) is received. As a method for receiving an input for using the communication apparatus 151 from the user, the input interface 102 or the display unit 108 may be used. Alternatively, the information processing apparatus 101 may receive this input, for example, through a screen displayed by the print application.

If this input is received (YES in step S507), the information processing apparatus 101 executes the process of step S508. If an input for not using the communication apparatus 151 (an input to the button 1402) is received (NO in step S507), the processing ends.

In step S508, via the short-range communication unit 110, the information processing apparatus 101 requests the short-range communication unit 157 through GATT communication to write information (software-on instruction information) for shifting the communication apparatus 151 to the software-on state. Specifically, the information processing apparatus 101 specifies the UUIDs of a service and a characteristic corresponding to the software-on instruction information, thereby requesting the short-range communication unit 157 to write the software-on instruction information to the storage area 202 of the short-range communication unit 157 through GATT communication. In the present exemplary embodiment, the characteristic corresponding to this information corresponds to "software-on command" illustrated in FIG. 6.

In step S509, the short-range communication unit 157 determines whether a writing area for the information corresponding to the UUIDs specified by the information processing apparatus 101 in step S508 is present in the GATT data constructed in step S502. Further, the short-range communication unit 157 determines whether the writing of the service and the characteristic corresponding to the information is permitted. If a writing area for the information corresponding to the specified UUIDs is present in the GATT data, and the writing of the service and the characteristic corresponding to the information is permitted, the short-range communication unit 157 writes the specified information to this area. At this time, the short-range communication unit 157 writes, to the area of the software-on command, information for shifting the communication apparatus 151 to the software-on state. Consequently, the information processing apparatus 101 can write the software-on instruction information to the GATT data. If the writing is completed, the short-range communication unit 157 notifies the communication apparatus 151 (the CPU 154) that the information is written to the area of the "software-on command". If, on the other hand, a writing area for the information corresponding to the specified UUIDs is not present in the GATT data, or the writing of the service and the characteristic corresponding to the information is not permitted, the short-range communication unit 157 does not execute the processes of step S509 and thereafter.

Receiving from the short-range communication unit 157 the notification that the information is written to the area of the "software-on command" in step S509 (detecting that the software-on instruction is written to the storage area 202), then in step S510, the communication apparatus 151 executes a software-on process. The software-on process is the process of shifting the power state of the communication apparatus 151 to the software-on state. The software-on process is performed, whereby the information processing apparatus 101 shifts to the software-on state so that from this point onward, the processing as described in FIG. 4 can be executed. That is, a condition for starting the process of step S403 is satisfied again, and the processes of step S403 and thereafter are executed again, whereby the information processing apparatus 101 can execute wireless LAN communication with the communication apparatus 151. Alternatively, a condition for starting the process of step S403 may not be satisfied again, and the processes of steps S405 and S406 may be automatically performed after step S510.

As described above, according to the present exemplary embodiment, the information processing apparatus 101 first acquires the information of the power state of the communication apparatus 151 via the short-range communication unit 110 and thereby can switch the subsequent processing according to the acquired information. Then, if the communication apparatus 151 is in the software-on state, the information processing apparatus 101 can establish a wireless LAN connection with the communication apparatus 151 based on the communication information acquired via the short-range communication unit 110. Further, if the communication apparatus 151 is not in the software-on state, the information processing apparatus 101 can, without acquiring the communication information, display a warning screen indicating that the communication apparatus 151 is not in the software-on state, or shift the communication apparatus 151 to the software-on state. Consequently, the information processing apparatus 101 can avoid acquiring information that is not the latest information. Further, even if the user is not near the communication apparatus 151, the user can know the power state of the communication apparatus 151. Further, if the communication apparatus 151 is not in the software-on state, the user can know that predetermined functions cannot be executed.

If acquiring the predetermined information, the information processing apparatus 101 becomes able to transmit an execution request to execute a function corresponding to the predetermined information to the communication apparatus 151. Specifically, for example, if acquiring the predetermined information, the information processing apparatus 101 enables a button, on a display screen, for transmitting an execution request to execute the function corresponding to the predetermined information to the communication apparatus 151. If the enabled button is selected by the user, the information processing apparatus 101 transmits an execution request to execute the function corresponding to the predetermined information to the communication apparatus 151. If, on the other hand, not acquiring the predetermined information, the information processing apparatus 101 disables the button, on the display screen, for transmitting an execution request to execute the function corresponding to the predetermined information to the communication apparatus 151. The user cannot select the disabled button. Thus, if not acquiring the predetermined information, the information processing apparatus 101 does not transmit an execution request to execute the function corresponding to the predetermined information to the communication apparatus 151.

A second exemplary embodiment is described below. A description is given of a form for solving the problems by control different from that of the first exemplary embodiment. The configuration of each apparatus according to the present exemplary embodiment is not described here on the assumption that the configuration is equivalent to that according to the first exemplary embodiment, unless otherwise stated.

In the present exemplary embodiment, processing executed by the communication apparatus 151 and the information processing apparatus 101 via the short-range communication unit 110 and the short-range communication unit 157 in a case where the apparatus state of the communication apparatus 151 is the software-on state is similar to that in the first exemplary embodiment. That is, the processing illustrated in the flowchart in FIG. 4 is similarly executed also in the present exemplary embodiment.

With reference to FIG. 7, processing according to the present exemplary embodiment is described. FIG. 7 is a flowchart illustrating processing executed by the communication apparatus 151 and the information processing apparatus 101 via the short-range communication unit 110 and the short-range communication unit 157 in a case where the power state of the communication apparatus 151 is the software-off state in the present exemplary embodiment. The processing executed by each apparatus is actually achieved by the CPU of the apparatus loading various programs stored in a storage area such as the ROM or the RAM of the apparatus into the RAM of the apparatus and executing the loaded programs. Further, a condition for executing the processes of step S701 and thereafter in the flowchart in FIG. 7 is similar to the condition for executing the processes of step S501 and thereafter in the flowchart in FIG. 5. Further, a condition for executing the processes of step S704 and thereafter in the flowchart in FIG. 7 are similar to the condition for executing the processes of step S504 and thereafter in the flowchart in FIG. 5.

The processes of steps S701, S702, and S704 in FIG. 7 are similar to the processes of steps S501, S502, and S503 in FIG. 5, and therefore are not described here.

In step S703, the short-range communication unit 157 changes the data structure of the GATT data included in the storage area 202. That is, the short-range communication unit 157 changes GATT data as illustrated in FIG. 6 included in the storage area 202 in the normal operating state, thereby constructing GATT data as illustrated in FIG. 8 or 9. The configuration of the GATT data in FIG. 8 is different from that of the GATT data in FIG. 6 in that values set for characteristics corresponding to the SSID and the password cannot be read or written by the information processing apparatus 101. Further, the configuration of the GATT data in FIG. 9 is different from that of the GATT data in FIG. 6 in that characteristics corresponding to the SSID and the password are not present (are deleted). In step S705, the short-range communication unit 157 determines whether the information corresponding to the UUIDs specified by the information processing apparatus 101 in step S704 is present in the GATT data constructed in step S703. Further, the short-range communication unit 157 determines whether the reading of the service and the characteristic corresponding to the information is permitted. At this time, in the present exemplary embodiment, if the communication apparatus 151 is in the software-off state, the GATT data in FIG. 8 or 9 is constructed as described above. That is, if the communication apparatus 151 is in the software-off state, the information corresponding to the UUIDs specified to acquire the communication information according to the request made in step S704 is not present in the GATT data, or the reading of the service and the characteristic corresponding to the information is not permitted. Thus, if the communication apparatus 151 is in the software-off state, the short-range communication unit 157 does not transmit the information corresponding to the specified UUIDs to the short-range communication unit 110, and transmits information indicating an error. At this time, the communication apparatus 151 may shift from the software-off state to the normal operating state. Then, after shifting to the normal operating state, the communication apparatus 151 may transmit the information corresponding to the UUIDs specified by the information processing apparatus 101 in step S704 to the information processing apparatus 101.

In step S706, the information processing apparatus 101 acquires the error information from the short-range communication unit 157. At this time, the short-range communication unit 157 explicitly indicates that the reading is erroneous. Thus, the information processing apparatus 101 can execute the subsequent processing without misunderstanding information acquired from the short-range communication unit 157. At this time, the information processing apparatus 101 may display on the display unit 108 the screen (FIG. 14) indicating that the communication apparatus 151 is not in the software-on state, as in step S506. Further, the information processing apparatus 101 may execute the processes of step S506 and thereafter in the first exemplary embodiment, thereby shifting the communication apparatus 151 to the software-off state.

The behavior of the information processing apparatus 101 when the information processing apparatus 101 acquires the predetermined information and the behavior of the information processing apparatus 101 when the information processing apparatus 101 does not acquire the predetermined information are similar to those in the first exemplary embodiment.

In the present exemplary embodiment, if the communication apparatus 151 is operating in the software-on state, the data structure of the GATT data included in the storage area 202 is not changed. That is, for example, the structure of the GATT data included in the storage area 202 is as illustrated in FIG. 6. In this state, the communication information can be acquired. Thus, if the communication apparatus 151 is operating in the software-on state, the information processing apparatus 101 can acquire desired information from the short-range communication unit 157 without acquiring error information.

As described above, according to the present exemplary embodiment, if the communication apparatus 151 is in the software-off state, the communication apparatus 151 changes the structure and the content of the GATT data and performs control so that the predetermined information is not read by the information processing apparatus 101. That is, in the present exemplary embodiment, unlike the first exemplary embodiment, the communication apparatus 151 executes control for preventing the information processing apparatus 101 from acquiring information that is not the latest information. Further, according to the present exemplary embodiment, if specified information cannot be acquired via the short-range communication unit 110, the information processing apparatus 101 can acquire error information. Then, only when correct information is acquired, the information processing apparatus 101 can execute the subsequent processing.

OTHER EXEMPLARY EMBODIMENTS

In the above exemplary embodiments, if the communication apparatus 151 is in the software-off state, control is performed so that the information processing apparatus 101 does not acquire the predetermined information. Alternatively, the problems may be solved by a method different from such control. For example, the form may be such that also if the communication apparatus 151 is in the software-off state, the information processing apparatus 101 acquires the predetermined information as normal, but if the information processing apparatus 101 detects that the communication apparatus 151 is in the software-off state, the information processing apparatus 101 does not execute processing using the acquired predetermined information. That is, if the communication apparatus 151 is in the software-off state, control may be performed so that the information processing apparatus 101 results in not executing processing using the predetermined information. This control may be performed by the information processing apparatus 101 or the communication apparatus 151. Specifically, if the information processing apparatus 101 detects that the communication apparatus 151 is in the software-off state, and even if the information processing apparatus 101 acquires the predetermined information, the information processing apparatus 101 may disable the button, on the display screen, for transmitting an execution request to execute the function corresponding to the predetermined information to the communication apparatus 151.

In the above exemplary embodiments, a description has been given of the form in which processing is switched between a case where the communication apparatus 151 is in the software-off state and a case where the communication apparatus 151 is not in the software-off state. The above exemplary embodiments, however, are not limited to this form. Alternatively, for example, the form may be such that processing is switched between a case where the communication apparatus 151 is in any of the power saving states and a case where the communication apparatus 151 is in none of the power saving states (is in the normal operating state).

Further, for example, the form may be such that both in a case where the communication apparatus 151 is in the software-off state and in a case where the communication apparatus 151 is not in the software-off state, an execution request to execute the function corresponding to the predetermined information is transmitted to the communication apparatus 151. In this form, if the communication apparatus 151 is in the software-off state, the information processing apparatus 101 displays on the display unit 108 a screen notifying the user that the communication apparatus 151 is in the software-off state, and the communication apparatus 151 cannot execute the function corresponding to the predetermined information.

The present invention can also be achieved by the process of supplying a program for achieving one or more functions of the above exemplary embodiments to a system or an apparatus via a network or various storage media, and of causing a computer (a CPU or a microprocessor unit (MPU)) of the system or the apparatus to read and execute the program. Further, the program may be executed by a single computer, or may be executed by the cooperation of a plurality of computers. Further, not all the above processing needs to be achieved by software, and part or all of the processing may be achieved by hardware such as an application-specific integrated circuit (ASIC). Further, the present invention is not limited to the form in which a single CPU performs all the processing. Alternatively, the form may be such that a plurality of CPUs appropriately cooperates to perform processing. Yet alternatively, the form may be such that a single CPU executes any of the above processing, and a plurality of CPUs cooperates to perform the rest of the processing.

According to the present invention, it is possible to improve convenience for a user using a communication apparatus for operating in a power saving state, or it is possible to improve convenience for a user using an information processing apparatus for acquiring information from a communication apparatus for operating in a power saving state.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-162208, filed Aug. 22, 2016, which is hereby incorporated by reference herein in its entirety.

What is claimed is:

1. A control method for controlling an information processing apparatus for communicating with a communication apparatus, wherein the communication apparatus is able to operate in a first state and a second state, and power consumption by the communication apparatus in the second state is larger than power consumption by the communication apparatus in the first state, the control method comprising:
  accepting an operation for performing communication with the communication apparatus;
  receiving state information, which indicates whether the communication apparatus is operating in the first state or the communication apparatus is operating in the second state, from the communication apparatus in a case where the operation is accepted;
  displaying an input screen for receiving, from a user, an input regarding whether or not to cause the communication apparatus to shift into the second state, based on determining that the received state information indicates that the communication apparatus is in the first state;
  transmitting, to the communication apparatus, an instruction for causing the communication apparatus to shift into the second state, in a case where an input for causing the communication apparatus to shift into the second state is received via the input screen; and
  performing predetermined communication with the communication apparatus, without displaying the input screen and without performing transmission of the instruction, in a case where the received state information indicates that the communication apparatus is in the second state, and performing the predetermined communication with the communication apparatus after the communication apparatus shifts into the second state in accordance with the instruction in a case where the received state information indicates that the communication apparatus is in the first state.

2. The control method according to claim 1, wherein, in a case where the operation is accepted and where the communication apparatus is in the second state, an acquisition process for acquiring predetermined information for transmitting an execution request to the communication apparatus is executed in the predetermined communication, and in a case where the operation is accepted and where the communication apparatus is in the first state, the acquisition process is executed in the predetermined communication after the communication apparatus shifts into the second state, wherein, in a case where the predetermined information is acquired, the information processing apparatus is caused to operate in a predetermined state.

3. The control method according to claim 1,
wherein the predetermined communication is communication based on Bluetooth Low Energy®.

4. The control method according to claim 1,
wherein, in a case where the operation is accepted and where the communication apparatus is in a third state where power consumption is smaller than in the second state and larger than in the first state, the predetermined communication is performed.

5. The control method according to claim 1, further comprising:
in a case where the communication apparatus is in the first state, accepting a predetermined operation from a user,
wherein, in a case where the predetermined operation is accepted, the predetermined communication is performed.

6. The control method according to claim 1, further comprising:
wherein, in a case where the predetermined communication is performed, the information processing apparatus operates in a predetermined state where the information processing apparatus is able to transmit, to the communication apparatus, an execution request to execute a function for displaying, on a display unit included in the information processing apparatus, a remote operation screen for remotely operating the communication apparatus using the information processing apparatus.

7. The control method according to claim 6,
wherein the state information is acquired via GATT communication using Bluetooth Low Energy®, and
wherein, among GATT data possessed by the communication apparatus, GATT data corresponding to the state information is acquired by specifying at least one of a service and a characteristic corresponding to the state information in the GATT communication.

8. The control method according to claim 6,
wherein the function of displaying the remote operation screen on the display unit is a function for displaying information regarding status of the communication apparatus.

9. The control method according to claim 6,
wherein the function of displaying the remote operation screen on the display unit is a function for remotely changing a setting of the communication apparatus.

10. The control method according to claim 6,
wherein the function of displaying the remote operation screen on the display unit is a function provided by a server included in the communication apparatus.

11. The control method according to claim 10,
wherein power supplied to a server in a case where the communication apparatus is in the second state is larger than power supplied to the server in a case where the communication apparatus is in the first state, or no power is supplied to the server in a case where the communication apparatus is in the first state.

12. The control method according to claim 1,
wherein the information processing apparatus is able to communicate using a first communication method and communicate using a second communication method, in which it is possible to perform longer-range communication than in the first communication method, and
wherein the predetermined communication is performed using the first communication method.

13. The control method according to claim 12,
wherein, using the first communication method, communication information that relates to communication using the second communication method is communicated, and
wherein, in a case where a connection using the second communication method is established based on the communication information, communication between the information processing apparatus and the communication apparatus via the connection using the second communication method becomes possible.

14. The control method according to claim 13,
wherein the first communication method is Bluetooth Low Energy®, and
wherein the second communication method is Wi-Fi®.

15. The control method according to claim 13,
wherein the communication information includes an SSID of an access point.

16. The control method according to claim 1,
wherein the communication apparatus is a printer that is able to perform printing.

17. The control method according to claim 1,
wherein the predetermined communication is transmission of print data for causing the communication apparatus to perform printing.

* * * * *